(12) United States Patent
Goldschmidt

(10) Patent No.: US 7,103,743 B2
(45) Date of Patent: Sep. 5, 2006

(54) SYSTEM AND METHOD OF ACCESSING VITAL PRODUCT DATA

(75) Inventor: Marc A. Goldschmidt, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 10/226,835

(22) Filed: Aug. 23, 2002

(65) Prior Publication Data

US 2004/0039892 A1    Feb. 26, 2004

(51) Int. Cl.
*G06F 12/00* (2006.01)
(52) U.S. Cl. ........................... 711/170; 711/154
(58) Field of Classification Search ........... 711/170, 711/156; 710/104, 8, 15; 713/100
See application file for complete search history.

(56) References Cited

U.S. PATENT DOCUMENTS 6,792,479 B1 *    9/2004    Allen et al. .................. 710/10

OTHER PUBLICATIONS

IBM Technical Disclosure Bulletin, "Microcode POS Register Implementation", Aug. 1991, vol. 34 issue 3 pp. 286-289.*
Migrating from Intel 80310 I/O Processor Chipset to Intel 80321 I/O Processor Applicatoin Note, Feb. 2002, 44 pages.
Intel 80321 I/O Processor Developer's Manual, Feb. 11, 2002, chapter 1-3, 179 pages.
PCI Express Base Specification, Rev. 1.0, Jul. 16, 2002, chapter 1; 43 pages.
PCI Local Bus Specification, Rev. 2.3, Mar. 29, 2002, 322 pages.

* cited by examiner

*Primary Examiner*—Mano Padmanabhan
*Assistant Examiner*—Paul Baker
(74) *Attorney, Agent, or Firm*—Grossman, Tucker, Perreault & Pfleger PLLC

(57) ABSTRACT

Described are a system and method of accessing vital product data (VPD) information. A first processing system may initiate a configuration write request to a VPD address register. A second processing system may access a VPD data register associated with the VPD address register in response to an interrupt signal.

12 Claims, 6 Drawing Sheets

SYSTEM AND METHOD OF ACCESSING VITAL PRODUCT DATA

BACKGROUND

1. Field

The subject matter disclosed herein relates to processing platforms. In particular, the subject matter disclosed herein relates to accessing information relating to devices or subsystems in a processing platform.

2. Information

Processing platforms typically comprise processing resources which are integrated to meet one or more system requirements. For example, a typical processing platform may comprise devices or subsystems that enable the processing platform to fulfill system requirements. Such system requirements may be associated with one or more aspects of platform performance, reliability or availability.

A processing platform typically comprises one or more management subsystems to monitor other subsystems or devices. The management subsystems typically define data structures to maintain information associated with various field replaceable units (FPUs), software or firmware in the processing platform. Such information typically includes performance or failure data associated with a particular device or subsystem.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
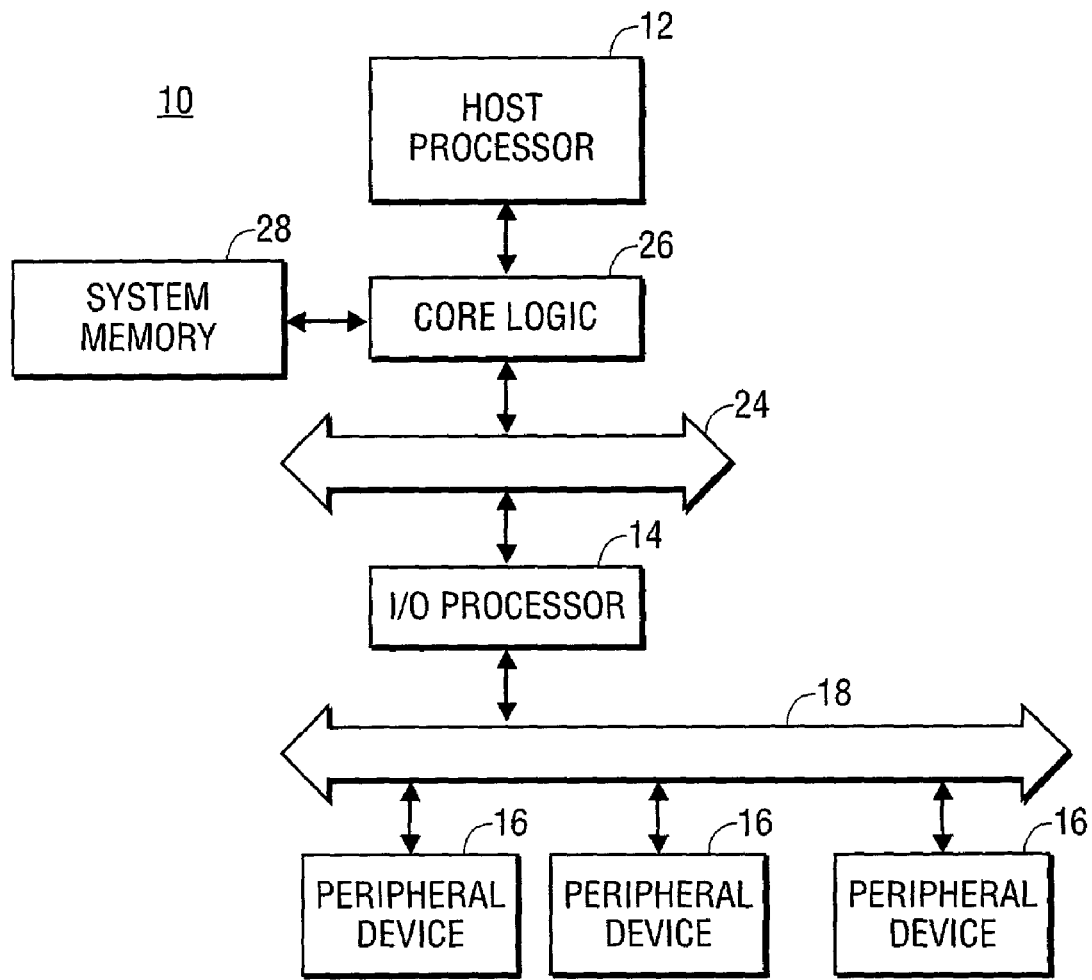
FIG. 1 shows a schematic of a processing platform according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Storage medium" as referred to herein relates to media capable of maintaining expressions which are perceivable by one or more machines. For example, a storage medium may comprise one or more storage devices for storing machine-readable instructions or data. Such storage devices may comprise storage media such as, for example, optical, magnetic or semiconductor storage media. However, this is merely an example of a storage medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a storage medium in combination with processing circuitry to execute such machine-readable instructions. However, these are merely examples of structures which may provide logic and embodiments of the present invention are not limited in this respect.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and a peripheral device, and embodiments of the present invention are not limited in these respects.

"Vital product data" (VPD) as referred to herein relates to information representative of a device or subsystem of a processing platform. For example, VPD may be descriptive of hardware, software or a microcode element of a system. VPD may provide information associated with a field replaceable unit (FRU), a part number, serial number or other information. VPD may also provide status information associated with a device or subsystem such as performance data or failure data. However, these are merely examples of VPD and embodiments of the present invention are not limited in these respects.

A "data bus" as referred to herein relates to circuitry for transmitting data between devices. For example, a data bus may transmit data between a host processing system and a peripheral device. A data bus may be formed according to the Peripheral Components Interconnect (PCI) Local Bus Specification, Rev. 2.3, Mar. 29, 2002 (hereinafter the PCI Local Bus Specification) or the PCI-X 2.0 Protocol Specification (hereinafter the PCI-X 2.0 Protocol Specification). However, these are merely examples of a data bus and embodiments of the present invention are not limited in these respects.

A "bridge" may be coupled to a processing system through a "primary data bus." Such a bridge may also be coupled to a "secondary data bus" to transmit data between the bridge and devices coupled to the secondary data bus. Accordingly, the bridge may transmit data from devices coupled to the secondary bus toward the processing system through the primary bus. Similarly, the bridge may transmit data received from the processing system on the primary bus to devices coupled to the secondary bus. However, these are merely examples of a bridge, and primary and secondary data busses coupled to a bridge, and embodiments of the present invention are not limited in these respects.

A "memory" as referred to herein relates to a system for storing data in a retrievable format. For example, a memory may comprise a storage medium comprising an array of memory locations for storing data. Such a memory location may be associated with a "memory address" to enable retrieval of data stored at the memory location. However, these are merely examples of a memory and memory address, and embodiments of the present invention are not limited in these respects.

A process or entity may "access" data in a memory or portion of a memory at a memory address. For example, a process may access a memory to write data to or read data from a location in the memory associated with a memory address. Such a location in memory may store data in predefined data registers.

A "configuration header" as referred to herein relates to memory locations associated with a device coupled to a data bus which are accessible in bus transactions addressed to the device. For example, a device may provide a configuration header as formatted data comprising data fields with information identifying the device and/or resource requirements of one or more functions of the device in response to a request. However, this is merely an example of a configuration header and embodiments of the present invention are not limited in this respect.

A data bus protocol may define a "configuration read request" which may be addressed to a device or function of a device in order to access one or more fields in a configuration header associated with the device or function. Data in one or more fields of the configuration header may be provided to a requesting entity in response to a configuration read request. A data bus protocol may also define a "configuration write request" which may be addressed to a device in order to write data in one or more registers of a configuration header. Data in one or more fields of the configuration header may be written to, or otherwise altered, in response to a configuration write request. However, these are merely examples of a configuration read request and configuration write request, and embodiments of the present invention are not limited in these respects.

A "VPD data register" as referred to herein relates to a predetermined memory location to store VPD associated with a device or subsystem. A VPD data register located in a PCI configuration header of a device may be accessible through a configuration read request or a configuration write request addressed to the device. However, this is merely an example of a VPD data register and embodiments of the present invention are not limited in this respect.

A "VPD address register" as referred to herein relates to a predetermined memory location to store information associating a device or subsystem with VPD information. A VPD address register located in a PCI configuration header of a device may be accessible through a configuration read request or a configuration write request addressed to the device. Information provided in a VPD address register may be used to locate VPD information associated with a particular device or subsystem. However, this is merely an example of a VPD address register and embodiments of the present invention are not limited in this respect.

An "interrupt signal" as referred to herein relates to a signal to inform a process or entity on a processing system that a certain event has occurred or condition exists. In response to an interrupt signal, a processing system may take a specified action. For example, a processing system may temporarily suspend execution of a process to respond to the associated event or condition. However, these are merely examples of an interrupt signal and embodiments of the present invention are not limited in these respects.

An "interrupt service routine" or "interrupt handler" as referred to herein relates to a process which may be executed by a processing system to take action in response to an interrupt signal. For example, a processing system may execute an interrupt service routine or interrupt handler from instructions which are stored in a memory at an interrupt service routine memory address. Accordingly, in response to an interrupt signal, a processing system may suspend execution of a current task and commence the sequential execution of instructions beginning with an instruction located at the interrupt service routine memory address. However, these are merely examples of an interrupt service routine or an interrupt handler, and embodiments of the present invention are not limited in these respects.

Briefly, an embodiment of the present invention relates to a system and method of accessing VPD information. A first processing system may initiate a configuration write request to a vital product data (VPD) address register. A second processing system may access a VPD data register associated with the VPD address register in response to an interrupt signal. However, this is merely an example embodiment and other embodiments of the present invention are not limited in these respects.

FIG. 1 shows a schematic of a processing platform 10 according to an embodiment of the present invention. A host processor 12 coupled to a system memory 28 by core logic 26 may provide a host processing system to host an operating system and application programs. An input/output (I/O) processor 14 may be coupled to the host processing system and one or more peripheral devices 16. The I/O processor 14 may host an operating system and applications to control access to and manage the peripheral devices 16.

A data bus 24 enables the I/O processor 14 to communicate with the host processing system and a data bus 18 enables the I/O processor 14 to communicate with the peripheral devices 16 according to data bus protocols. The I/O processor 14 may comprise an internal bridge (not shown) defining data bus 24 as a primary bus 24 and data bus 18 as a secondary bus. According to an embodiment, the primary and secondary busses 24 and 18 may be formed according to a PCI data bus structure such as that described in the PCI Local Bus Specification or according to the PCI-X 2.0 Protocol Specification. However, these are merely an example of a bus structure which may be employed in a data bus to transmit data between devices and embodiments of the present invention are not limited in this respect. Also, the internal bridge may be formed according to the PCI-to-PCI Bridge Architecture Specification, Rev. 1.1, Dec. 18, 1998 (hereinafter the "PCI-to-PCI Bridge Specification"). However, this is merely an example of how a bridge may be implemented to form primary and secondary data busses in a processing platform, and embodiments of the present invention are not limited in this respect.

Figure 2:
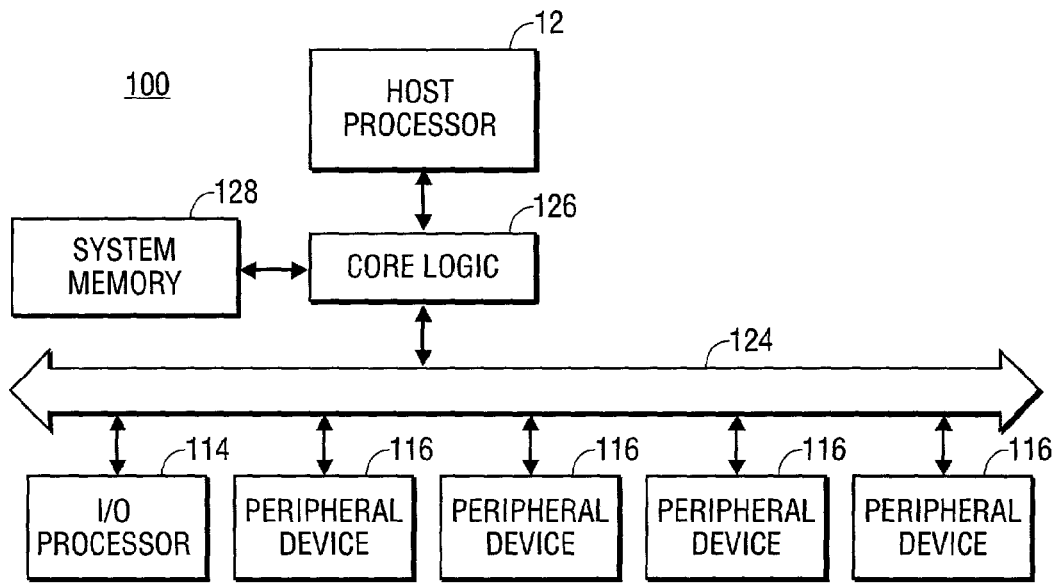
FIG. 2 shows a schematic diagram of a processing platform according to an alternative embodiment of the present invention.

FIG. 2 shows a schematic diagram of a processing platform 100 comprising one or more peripheral devices 116 according to an alternative embodiment of the present invention. Unlike the peripheral devices 16 in the embodiment of FIG. 1, the peripheral devices 116 are coupled to an I/O processor 114 and core logic 126 directly by data bus 124 independently of an intervening bridge. Accordingly, the data bus 124 may enable a host processing system comprising the host processor 112 and system memory 128 to communicate with the peripheral devices 116 or device functions of the peripheral devices 116 independently of an intervening bridge coupled between the data bus 124 and the peripheral device 116.

In other embodiments, an I/O processor may be coupled to a host processing system as an "endpoint" device through a "root complex" as provided in a PCI Express environment described in the PCI Express Base Specification Rev. 1.0, Jul. 16, 2002 (hereinafter the "PCI Express Specification"). For example, the I/O processor may be coupled to a downstream port of a "switch" while communicating with peripheral devices coupled to other downstream ports of the switch. Alternatively, the I/O processor may be coupled to peripheral devices by a data bus formed according to the PCI Local Bus Specification or the PCI-X 2.0 Protocol Specification. In another example, the I/O processor may be coupled to an upstream port of a second switch to communicate with peripheral devices coupled to downstream ports of the second switch. However, these are merely examples of how an I/O processor may be coupled to communicate with a host processing system and peripheral devices in a PCI Express environment, and embodiments of the present invention are not limited in these respects.

The host processor 12 or 112 may comprise any one of several general central processing units (CPUs) such as a Pentium®, Xeon® or Itanium® processor sold by Intel Corporation. The core logic 26 or 126 may comprise any one of several motherboard chipsets including, for example, a memory controller hub (MCH) controlling access to system memory and an I/O controller hub (ICH) controlling communication between the host processing system and one or more peripheral devices. In particular embodiments, the core logic 26 or 126 may be capable of supporting inter-device communication according to the PCI Local Bus Specification, PCI-X 2.0 Protocol Specification or PCI Express Specification. The system memory 28 or 128 may comprise any one of several types of random access memory (RAM) devices such as SDRAM, RDRAM or DDR memory devices. The host processor 12 in combination with the system memory 28 or the host processor 112 in combination with the system memory 128 may be used to host firmware and any one of several operating systems such as versions of Windows® sold by Microsoft Corp., versions of Solaris® sold by Sun Microsystems, or versions of Linux available in the open source community. However, these are merely examples of components or subsystems that may be integrated to form a host processing system and embodiments of the present invention are not limited in these respects.

In the illustrated embodiment, the peripheral devices 16 or 116 may comprise any one of several peripheral I/O devices such as devices having an I/O interface formed according to variations of the Small Computer System Interface (SCSI) established by the National Committee for Information Technology Standards (NCITS). However, this is merely an example of an I/O interface that may be controlled by a peripheral device and other I/O interfaces may be formed according to different formats such as, for example, Fibre-Channel, SSA, IBA, Serial ATA or Ethernet. I/O interfaces may be adapted to communicate with any one of several I/O devices such as, for example, a storage system such as a Redundant Array of Independent Disks (RAID) (not shown), a communication port, a server, a client or other storage system directly or via a switch. Such a RAID system may comprise storage devices such as magnetic data storage disks.

According to an embodiment, any of the peripheral devices 16 or 116 may comprise logic to detect conditions or events that may affect one or more aspects relating to performance or reliability of the peripheral device, or availability of resources provided or controlled by the peripheral device. Such aspects may be indicative of device failure or degraded functionality, task loading or utilization. A peripheral device may transmit information regarding these conditions or events to a processing system (e.g., in a bus transaction message or out of band message) to be maintained in a non-volatile memory as VPD information associated with the peripheral device. In one example, a peripheral device may comprise a Host Bus Adapter (HBA) card that maintains information regarding detected conditions or events in a non-volatile memory. Also, a peripheral device may maintain such information (regarding conditions or events) associated with one or more field replaceable units (FRUs). However, these are merely examples of how a peripheral device may maintain information regarding conditions or events, and embodiments of the present invention are not limited in these respects.

Figure 3:
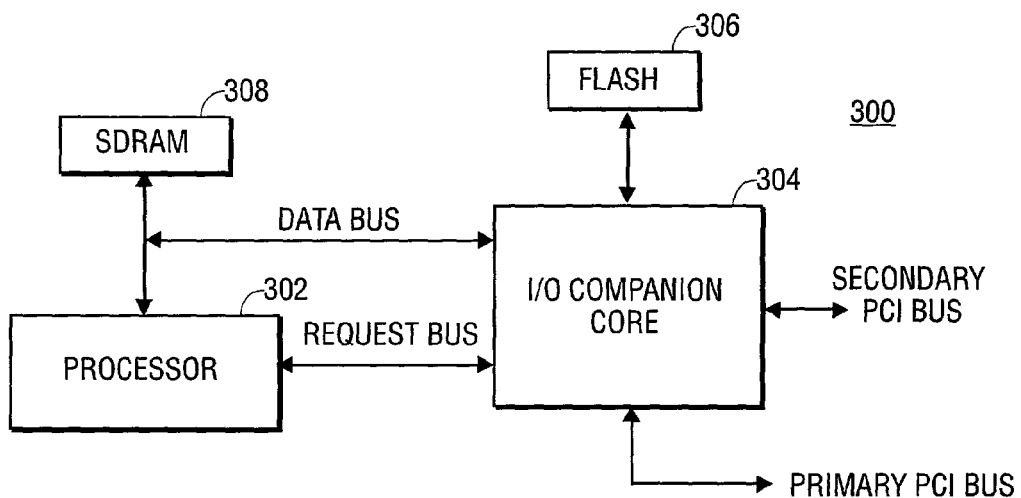
FIG. 3 shows a schematic diagram of an I/O processor according to either the I/O processor of FIG. 1 or FIG. 2.

FIG. 3 shows a schematic diagram of an I/O processor 300 according to either the I/O processor 14 of FIG. 1 or I/O processor 114 of FIG. 2. An I/O companion core 304 may comprise logic forming a bridge coupling primary and secondary buses, and logic to facilitate communication between a core processor 302 and memory devices such as SDRAM 308 and flash memory 306. For example, the I/O companion core 304 may comprise an 80312 I/O companion chip sold by Intel Corporation. However, this is merely an example of a logic core that may be used to facilitate communication among resources in an I/O processor and communication with a host processing system, and embodiments of the present invention are not limited in this respect.

The core processor 302 may comprise any one of several general purpose processing cores capable of responding to interrupt signals such as an i960® or XScale® processing cores sold by Intel Corporation. In other embodiments, the core processor 302 may comprise any one of several processing core designed by licensees of ARM® Ltd. For example, the core processor 302 may be adapted to receive and respond to interrupt signals such as IRQ or FIQ interrupt signals. However, these are merely examples of general purpose processing cores capable of responding to interrupts and embodiments of the present invention are not limited these respects.

The core processor 302 and I/O companion core 304 may be formed in separate semiconductor devices coupled by a request bus enabling communication between the two devices. Alternatively, the core processor and I/O companion core 304 may be formed in a single integrated semiconductor device. However, these are merely examples of how a core processor and I/O companion core may be integrated to form an I/O processor, and embodiments of the present invention are not limited in these respects.

The core processor 302 may comprise firmware to initialize a processing system in response to a reset event. Upon such a reset event, the core processor 302 may load the firmware from flash 306 to SDRAM 308, execute the firmware to launch an embedded operating system and configure devices coupled to either the primary or secondary data busses. The firmware may also initialize interrupt service routines that are to reside in the SDRAM 308 to be executed in response to interrupt signals from, for example, a host processing system or subsystem of the I/O companion core 304.

Figure 4:
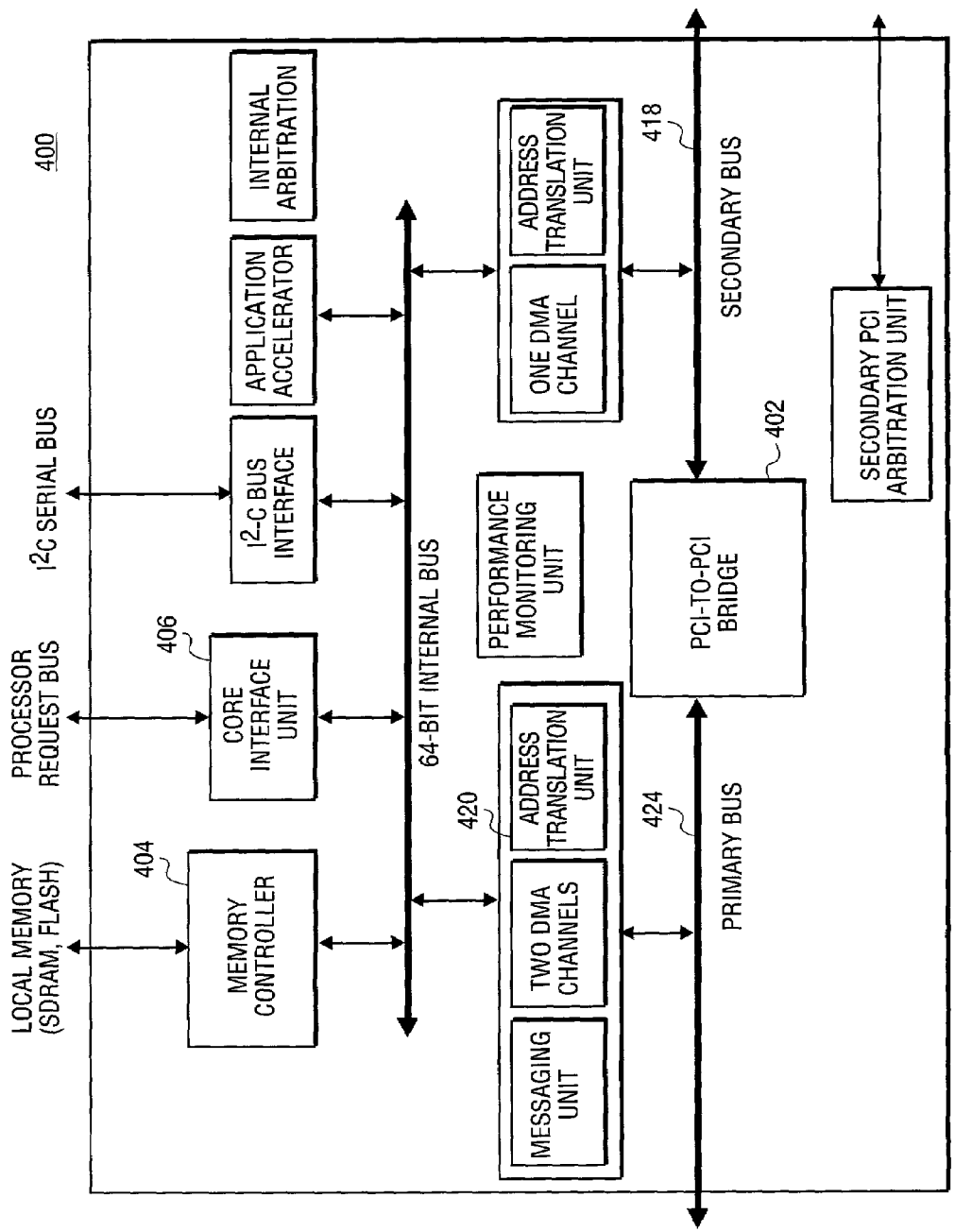
FIG. 4 shows a schematic diagram of an I/O companion core according to an embodiment of the I/O processor shown in FIG. 3.

FIG. 4 shows a schematic diagram of an I/O companion core 400 according to an embodiment of the I/O companion core 304 shown in FIG. 3. A PCI-to-PCI bridge 402 may couple primary bus 424 and secondary bus 418 according to the PCI-to-PCI Bridge Specification. A processor core (not shown) may access memory devices through a core interface unit 406 and memory controller 404.

According to an embodiment, the companion core 400 may trigger an interrupt signal to a core processor in response to receipt of a data bus transaction request received on the primary data bus 424. An address translation unit (ATU) 420 may comprise logic to initiate an interrupt signal to the core processor, and set and clear related interrupt status bits in an interrupt status register. In response to a bus transaction addressed to the I/O processor (e.g., a memory I/O read or write transaction addressed to an allocated base address register (BAR) or a configuration read or write transaction addressed to a register in a configuration header), the ATU 420 may associate the received transaction with a target register (e.g., BAR in a memory I/O transaction request or configuration header register in a configuration request) and initiate the interrupt signal to the core processor. However, this is merely an example of how an interrupt signal to a processing system may be triggered in response to receipt of a data bus transaction request, and embodiments of the present invention are not limited in this respect.

Figure 5:
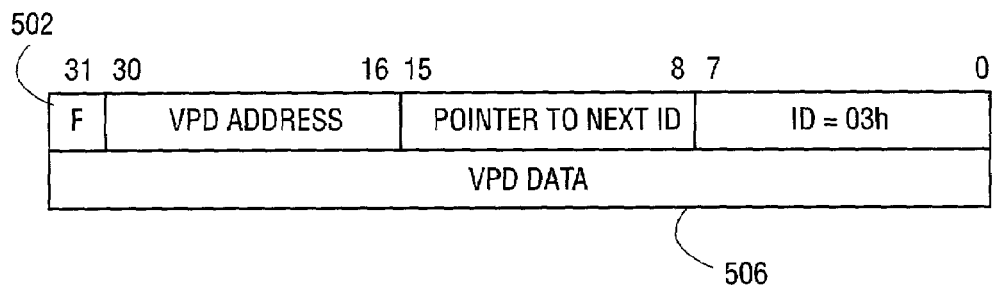
FIG. 5 shows a format of registers defined for containing vital product data (VPD) according to an embodiment.

FIG. 5 shows a format of registers 500 defined for containing vital product data (VPD) according to an embodiment. The registers 500 may be formatted in optional VPD extensions (e.g., following an initial 256-byte portion of a configuration header) of a PCI configuration header as described in the PCI Local Bus Specification at section 6.5 and in Appendix I. According to the embodiment of the I/O processor 300 shown in FIG. 3, registers in a PCI configuration header may be accessed in response to configuration read and configuration write requests on the primary data bus 424 addressed to the I/O processor 300 as described in the PCI Local Bus Specification at Chapter 3. Accordingly, VPD address register 504 and VPD data register 506 may be accessible in response to configuration read requests or configuration write requests addressed to the I/O processor from a host processing system.

In the illustrated embodiment, an interrupt signal may be generated to a core processor of the I/O processor in response to receipt of a configuration write request at the I/O processor addressed to the VPD address register 504. Such a configuration write request may set or clear a flag bit 502 of the VPD address register 504. In response to the interrupt signal, the core processor may execute an interrupt service routine to read from or write to the VPD data register 506, and change the status of the flag bit 502 to indicate that processing of the interrupt condition is complete.

Figure 6:
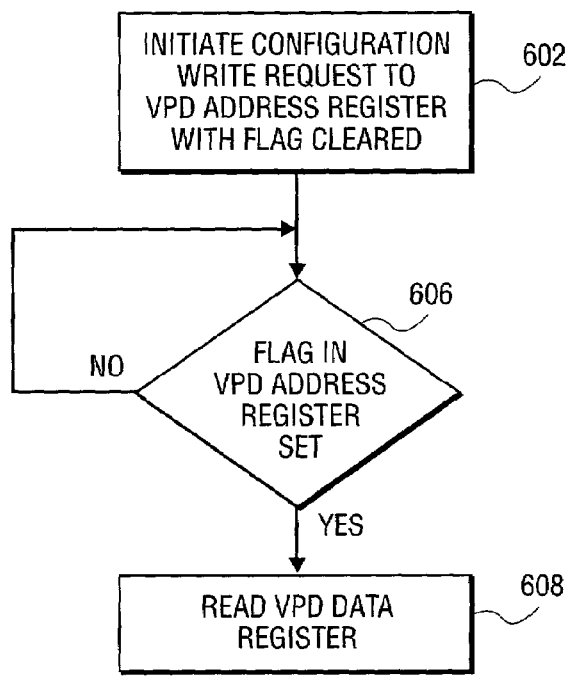
FIG. 6 shows a flow diagram illustrating a process executed by a host processing system to obtain VPD from an I/O processor according to an embodiment.
Figure 7:
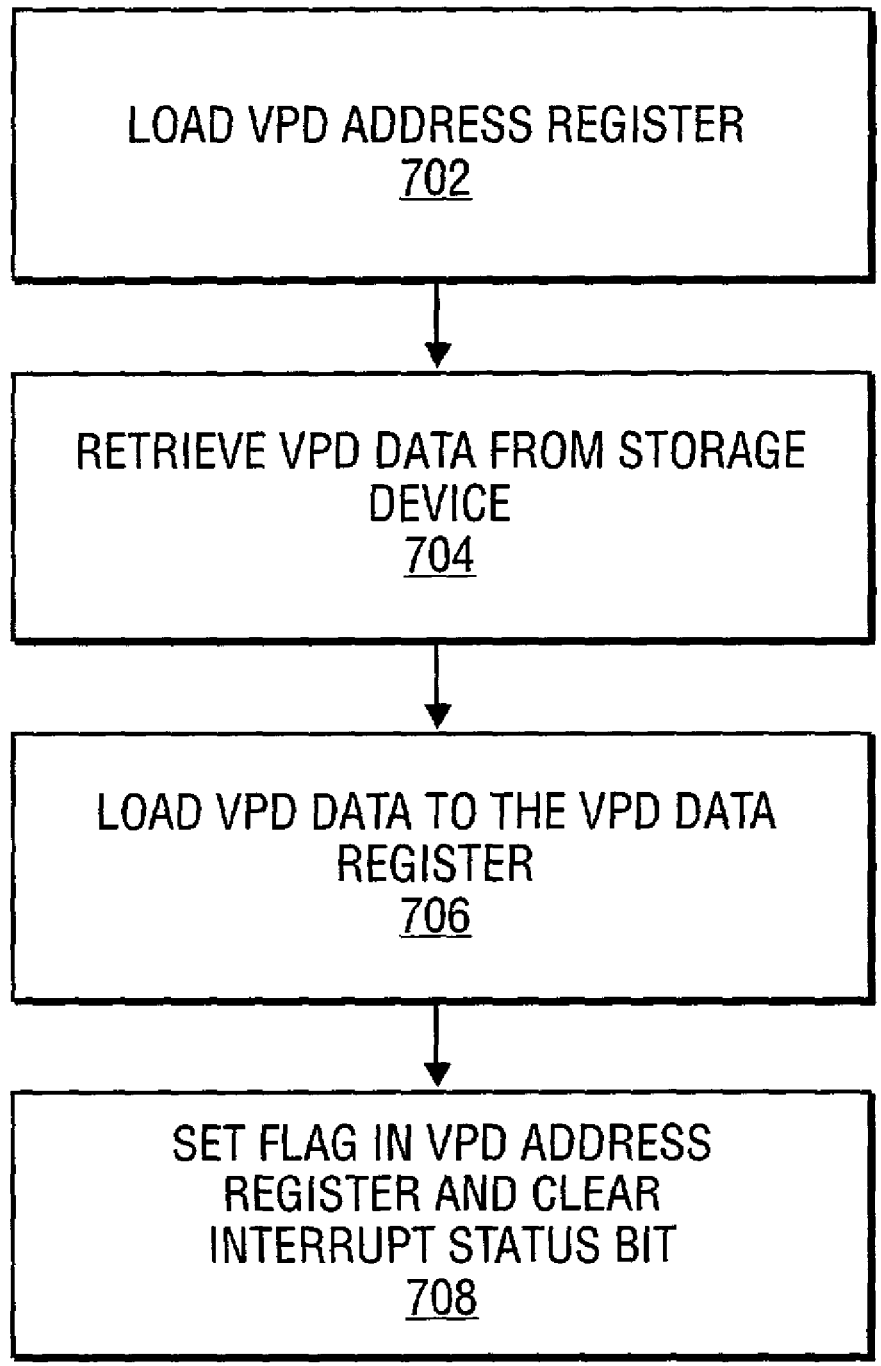
FIG. 7 shows a flow diagram illustrating a process executed by an I/O processor to provide information to a VPD data register according to an embodiment.

According to an embodiment of the registers 500, FIG. 6 shows a flow diagram illustrating a process 600 executed by a host processing system to obtain VPD information from an I/O processor and FIG. 7 illustrates a process 700 executed by the I/O processor in response to the process 600. Actions at blocks 602, 606 and 608 may be controlled or executed by machine-readable instructions stored in a system memory of the host processing system. At block 602, the host processing system initiates a configuration write transaction to the VPD address register 504 of a configuration header of the I/O processor. Data provided to the VPD address register 504 (in the configuration write request) may comprise, for example, data associated with a particular peripheral device or subsystem being controlled or monitored by the I/O processor. In response to this configuration write transaction, the flag bit 502 may be cleared to indicate that a request for VPD data is pending.

Upon receipt of the configuration write transaction addressed to the VPD address register 504, an interrupt signal may be generated to a core processor of the I/O processor. In response to the interrupt signal, blocks 702 through 708 may be executed by an interrupt service routine provided in firmware loaded to system memory which is accessible by the I/O processor. At block 702, the I/O processor may load data received from the configuration write request to the VPD address register 504. At block 704, the I/O processor may associate data which was loaded to the VPD address register 504 at block 702 with VPD information stored in a memory location. Such VPD information may include, for example, information relating to conditions or events affect one or more aspects of performance or reliability of a peripheral device being controlled or monitored by the I/O processor. Such a memory storing the VPD information may be located in, for example, a flash memory device (e.g., flash memory 306 as shown in FIG. 3) or a random access memory device (e.g., SDRAM 308 as shown in FIG. 3). However, this is merely an example of how an I/O processor may store VPD information in association with VPD address information, and embodiments of the present invention are not limited in these respects.

At block 706, the I/O processor may retrieve the VPD information associated with the VPD address information in the memory location and load the retrieved information to the VPD data register 506 in the I/O processor configuration header. At block 708, the I/O processor may set the flag 502 bit of the VPD address register 504 (indicating that the VPD data register 506 contains the data requested) and clear an interrupt status bit which was set in response to the interrupt signal. At diamond 606, the host processing system may poll the I/O processor to determine whether the request has been completed by periodically reading the VPD address register 504 (e.g., through periodic configuration read requests) to check the flag bit 502. When the host processing system detects that the flag 502 has been set, the host processing system may extract the requested VPD data from the VPD data register 506 at block 608 (e.g., by initiating one or more configuration read transactions addressed to the configuration header of the I/O processor).

Figure 9:
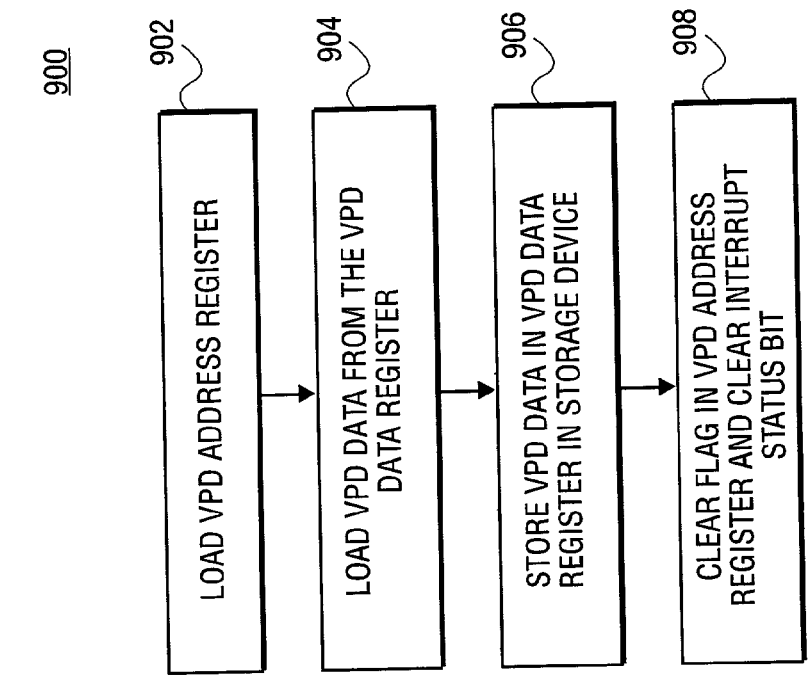
FIG. 9 shows a flow diagram illustrating a process executed by an I/O processor to store VPD received at a VPD data register according to an embodiment.
Figure 8:
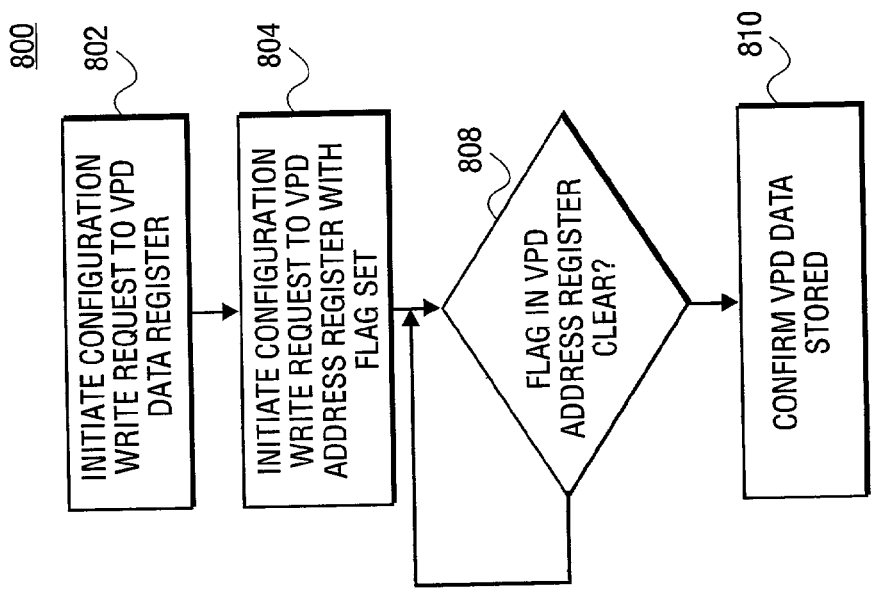
FIG. 8 shows a flow diagram illustrating a process executed by a host processing system to provide VPD to an I/O processor according to an embodiment.

According to an embodiment of the registers 500, FIG. 8 shows a flow diagram illustrating a process 800 executed by a host processing system to provide VPD information to an I/O processor, and FIG. 9 illustrates a process 900 executed by the I/O processor in response to the process 800. Actions at blocks 802 through 810 may be controlled or executed by machine-readable instructions stored in a system memory of the host processing system. At block 802, the host processing system may initiate a first configuration write request to the VPD data register 506 of a configuration header of the I/O processor. Data provided to the VPD data register 506 may comprise, for example, VPD information to be associated with a particular peripheral device or subsystem being controlled or monitored by the I/O processor. At block 804, the host processing system may initiate a second configuration write request to the VPD address register 504 providing information to be associated with the VPD information provided to the VPD data register 506 in the first configuration write request. In the configuration write request at block 804, the flag bit 502 may be set to indicate a pending request for storing VPD information.

Upon receipt of the configuration write transaction addressed to the VPD address register 504, an interrupt signal may be generated to a core processor of the I/O processor. In response to the interrupt signal, blocks 902, 904, 906 and 908 may be executed by an interrupt service routine provided in firmware loaded to system memory which is accessible by the I/O processor. The core processor of the I/O processor may respond to the interrupt signal at block 902 by loading data from the second configuration write request addressed to the VPD address register (block 804) to the VPD address register 504, and loading VPD data from the first configuration write request addressed to the VPD address register (block 802) to the VPD data register 506 at block 904.

At block 906, the I/O processor may associate data which was loaded to the VPD address register 504 at block 902 with a location in a memory that is to store VPD information data for a particular device or subsystem controlled or monitored by the I/O processor. Such a memory may be provided in, for example, a flash memory device (e.g., flash memory 306 as shown in FIG. 3) or a random access memory device (e.g., SDRAM 308 as shown in FIG. 3). The I/O processor may then store the VPD information loaded to the VPD data register 506 at block 904 to a location in the memory associated with the data loaded to the VPD address register 504. However, this is merely an example of how an I/O processor may store VPD information, and embodiments of the present invention are not limited in these respects.

At block 908, the I/O processor may clear an interrupt status bit which was set in response to the interrupt signal initiated upon receipt of the second configuration write transaction, and set the flag bit 502 of the VPD address register 504 (indicating that the VPD information provided to the VPD data register 506 at block 802 has been stored in memory accessible by the I/O processor). At diamond 808, the host processing system may poll the I/O processor to determine whether the request to store VPD information has been completed by periodically reading the VPD address register 504 to check the flag 502 through configuration read requests. At block 810, the host processing system may then confirm that the I/O processor has completed storing the VPD information in memory upon detecting that the flag bit 502 has been cleared.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
    initiating a configuration write transaction from a first processing system to a vital product data (VPD) address register associated with a second processing system; and
    initiating a configuration read transaction to a VPD data register associated with the second processing system in response to detecting that the second processing system has written to the VPD data register.

2. The method of claim 1, the method further comprising determining whether the second processing system has written to the VPD data register based upon a portion of the VPD address register.

3. An article comprising:
    a storage medium comprising machine readable instructions stored thereon to:
        initiate a configuration write transaction from a first processing system to a vital product data (VPD) address register associated with a second processing system; and
        initiate a configuration read transaction to a VPD data register associated with the second processing system in response to detecting that the second processing system has written to the VPD data register.

4. The article of claim 3, wherein the storage medium further comprises machine-readable instructions stored thereon to determine whether the second processing system has written VPD data to the VPD data register based upon a portion of the VPD address register.

5. A system comprising:
    a host processing system coupled to a first data bus;
    one or more peripheral devices coupled to a second data bus; and
    an I/O processing system comprising:
        a bridge coupled between the first and second data busses;
        logic to receive a configuration write request from the host processing system addressed to a VPD address register; and
        logic to access a VPD data register associated with the VPD address register in response to an interrupt signal.

6. The system of claim 5, wherein the one or more peripheral devices comprise at least one Ethernet compatible device.

7. The system of claim 5, wherein the one or more peripheral devices comprise at least one Serial ATA compatible device.

8. The system of claim 5, wherein the one or more peripheral devices comprise at least one Fibre-channel compatible device.

9. The system of claim 5, wherein the one or more peripheral devices comprise at least one Infiniband compatible device.

10. The system of claim 5, wherein the one or more peripheral devices comprise at least one SSA compatible device.

11. The system of claim 5, wherein at least one peripheral device comprises logic to control access to one or more magnetic storage disks.

12. A system comprising:
    a host processing system;
    one or more peripheral devices coupled to a data bus, the one or more peripheral, devices comprising at least one controller to read data from or write data to a mass storage device; and an I/O processing system coupled to the one or more peripheral devices through the data bus, the I/O processing system comprising:
    logic to receive a configuration write request from the host processing system addressed to a VPD address register; and
    logic to access a VPD data register associated with the VPD address register in response to an interrupt signal.

* * * * *

UNITED STATES PATENT AND TRADEMARK OFFICE
CERTIFICATE OF CORRECTION

PATENT NO. : 7,103,743 B2
APPLICATION NO. : 10/226835
DATED : September 5, 2006
INVENTOR(S) : Goldschmidt It is certified that error appears in the above-identified patent and that said Letters Patent is hereby corrected as shown below:

On the Title page, in field (56), under "Other Publications", in column 2, line 4, delete "Applicatoin" and insert -- Application --, therefor.

In column 10, line 65, in Claim 12, delete "peripheral," and insert -- peripheral --, therefor.

Signed and Sealed this

Seventeenth Day of June, 2008

JON W. DUDAS
*Director of the United States Patent and Trademark Office*